United States Patent [19]

Tabata et al.

[11] 4,317,215

[45] Feb. 23, 1982

[54] TUNING SYSTEM FOR CATV TERMINAL

[75] Inventors: Toshio Tabata; Hiroki Uemura, both of Tokyo, Japan

[73] Assignee: Pioneer Electronic Corporation, Tokyo, Japan

[21] Appl. No.: 74,486

[22] Filed: Sep. 11, 1979

[30] Foreign Application Priority Data

Sep. 13, 1978 [JP] Japan .................. 53-112832

[51] Int. Cl.³ .................. H04H 1/04; H04N 7/10
[52] U.S. Cl. .................. 455/5; 358/86
[58] Field of Search .................. 455/2, 3, 4, 5, 6, 169, 455/184; 358/84, 86, 117; 178/63 F

[56] References Cited

U.S. PATENT DOCUMENTS

| 3,733,430 | 4/1973 | Thompson et al. | 178/5.1 |
| 3,885,089 | 5/1975 | Callais | 455/3 |
| 3,978,411 | 8/1976 | Sakamoto | 455/184 |
| 3,988,681 | 10/1976 | Schurmann | 455/184 |
| 4,074,310 | 2/1978 | Hurney et al. | 455/5 |
| 4,077,006 | 2/1978 | Nicholson | 455/3 |
| 4,156,847 | 5/1979 | Tazawa | |
| 4,207,529 | 6/1980 | Amaya | 455/169 |

OTHER PUBLICATIONS

Two Way Applications for Cable Television Systems in the '70s, by R. Jurgen, An IEEE Spectrum Applications Report, IEEE Spectrum, Nov. 1971, pp. 39–54.

*Primary Examiner*—Jin F. Ng
*Assistant Examiner*—Tommy P. Chin
*Attorney, Agent, or Firm*—Fraser and Bogucki

[57] ABSTRACT

In a CATV system, channel identifying data is incorporated in each transmitted channel, and subscriber terminals return such data to the CATV center to indicate the channel actually being received. Further, the channel identifying data is compared to the channel selected, and when a proper comparison exists a sweep voltage is held at a predetermined level for the particular channel, to control frequency conversion at the terminal.

2 Claims, 1 Drawing Figure 4,317,215

TUNING SYSTEM FOR CATV TERMINAL

BACKGROUND OF THE INVENTION

This invention relates to a tuning system for a terminal in a CATV system.

CATV systems have been so arranged in the past that TV signals in a number of channels are transmitted downstream from a CATV center through a cable, and at each terminal of the same system, an electronic tuning converter converts the channel of the TV signal that has been selected into a specific channel frequency which is adapted to be received by a TV receiver. The electronic tuning converter is of a construction wherein a tuning voltage is supplied from a channel selecting device, a selected channel is determined by a signal from a local oscillator, the local oscillation frequency of which is determined by the tuning voltage, and the selected channel is further converted to the specific channel frequency.

In the above described conventional arrangement, however, drifts caused in the elements or in the tuning voltage tend to create a deviation in the tuning from the desired value.

In the CATV system, various programs, some charged or pay programs and some not charged, are supplied. Hence the tuning deviation becomes a problem. That is, when a tuning deviation occurs to an extent that not the selected channel but the next adjacent channel is received, the possiblilty exists of receiving the next channel despite an indication of reception of the selected channel. Then, if the selected channel is a non-pay channel and the next adjacent channel is a pay channel, the subscriber may receive the pay program and not be charged for it.

Furthermore, if a tuning voltage is received from outside the system, any desired channel can be received regardless of the reported selected channel. In this way, reception of a pay program while reporting to the center the reception of a a no-charge program is made possible.

An object of the present invention is to provide a tuning system which can prevent erroneous reception due to accompanying drift.

An embodiment of the present invention will now be described in detail with reference to the accompanying drawing.

BRIEF DESCRIPTION OF THE DRAWING

The attached single drawing is a block diagram showing an embodiment of the present invention.

DETAILED DESCRIPTION OF THE INVENTION

Figure 1:
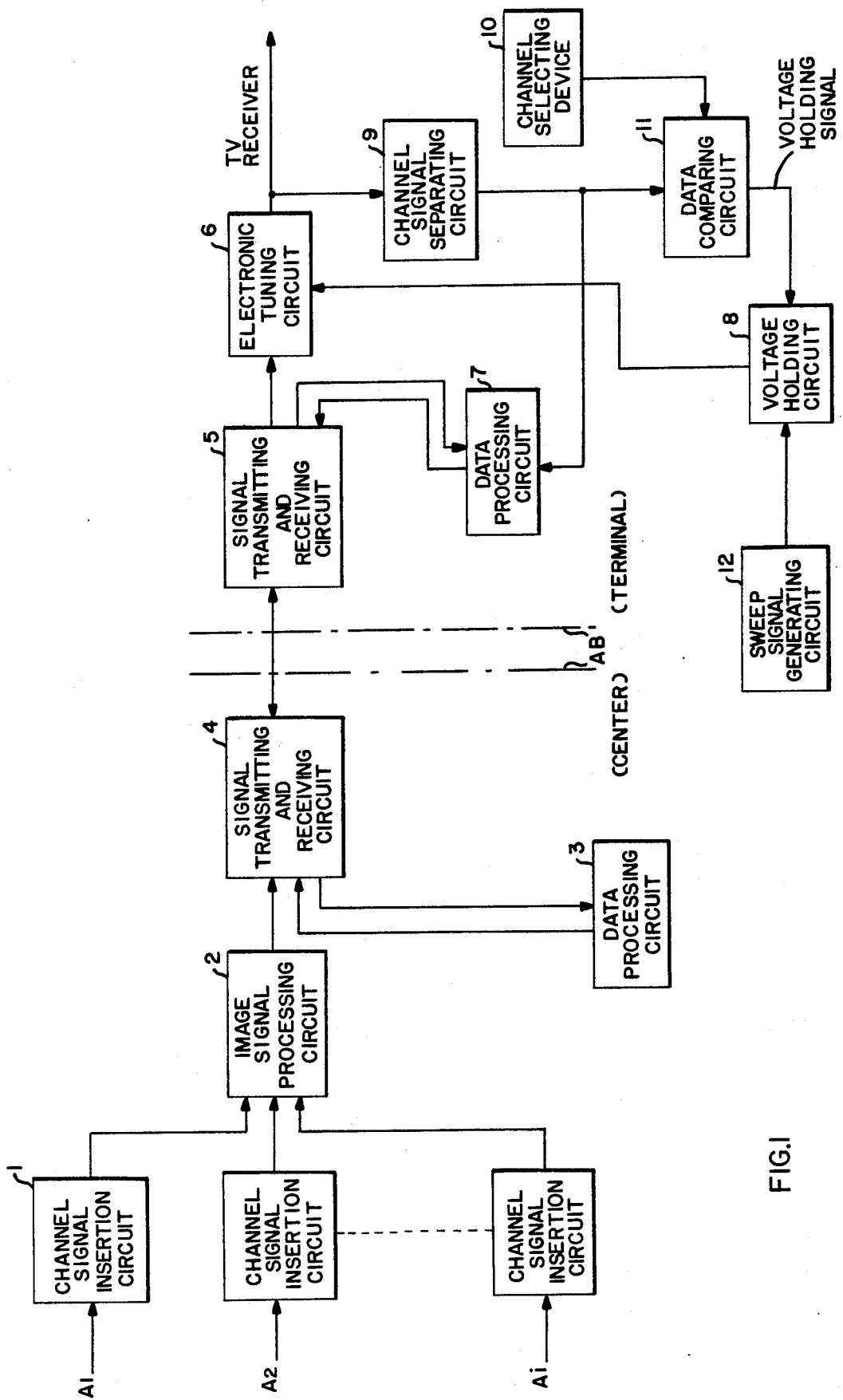

In a head end or CATV center A, TV signals $A_1$, $A_2$, ..., $A_i$ are combined with signals identifying the specific different channels in respective signal or number insertion channel circuits 1 with the channels being respectively modulated in an image signal processing circuit 2 into predetermined frequencies. The results are transmitted together with data signals from a data processing circuit 3 to each terminal B through a signal transmitting and receiving device 4 and a cable.

In the terminal B, the TV signals are received in another signal transmitting and receiving device 5, and the image signal components are sent to an electronic tuning converter 6, while the data signal components are sent to a data processing circuit 7. The electronic tuning converter 6 also receives a tuning voltage from a voltage holding circuit 8 as described hereinbelow in more detail, and a TV signal thus selected is sent to a TV receiver.

One part of the TV signal sent to the receiver is branched off into a channel signal separating circuit 9, and the channel identifying data in the received TV signal is extracted. The channel identifying data thus extracted is then sent through the data processing circuit 7 and the signal transmitting and receiving device 5 to the center A for reporting the number of the channel that has been selected.

On the other hand, the subscriber selection of a desired channel in the terminal B is carried out by operating a channel selecting device 10. Data as to the thus selected channel is sent to a data comparing circuit 11 together with the extracted channel data. When the two data coincide, a voltage holding signal is sent to the voltage holding circuit 8.

A sweep signal generating circuit 12 generates a sweep signal of a sweeping range sufficiently wide so as to cover all of the channels of the TV signals. The sweep signal is sent through the voltage holding circuit 8 to the electronic tuning converter 6 as a tuning voltage. Although the voltage holding circuit 8 passes the sweep signal without change when a voltage holding signal is not received, the circuit 8 determines the voltage of the sweep signal at the instant the voltage holding signal is received. This voltage is held until the voltage holding signal is removed by the data comparing circuit 11 when the selected channel fails to be the same as the tuned channel, and the channel selected by the channel selecting device 10 is thereby introduced into the TV receiver continuously so long as the holding signal is present.

According to the present invention, since identifying data of a channel actually received via the electronic tuning converter at the TV receiver is transmitted upstream to the CATV center, any possibility of reception of an erroneous channel can be eliminated. Furthermore, since a sweep signal is used as the tuning voltage of the electronic tuning converter, there is no need for a voltage stabilized power source of high stability or of resistors or variable resistors for dividing the voltage, and various advantages can thereby be obtained such as not requiring setting of tuning voltages for each of the channels and not requiring adjustment of the tuning elements (varicaps) for those channels regardless of deviations in their characteristics.

What is claimed is:

1. In a tuning system of a CATV terminal having an electronic tuning converter which in response to a tuning voltage converts a desired channel from TV signals containing separate channel identifying data on each channel and transmitted downstream from a CATV center into a specific channel frequency which is provided as an output, the improvement comprising a channel signal separating circuit connected to receive the output of the converter and extract the channel identifying data contained in a converted channel, a circuit coupled to receive the extracted channel identifying data from the channel signal separating circuit and transmit the channel identifying data to the CATV center, a data comparing circuit connected to compare channel selecting data obtained from a channel selecting device with said extracted channel identifying data and generate a holding signal when said two data coincide, a sweep signal generating circuit for generating a sweep signal in a voltage range capable of selecting all channels of said TV signals, and a voltage holding circuit which, while ordinarily passing said sweep signal therethrough, holds a voltage of said sweep signal in response to the holding signal and supplies said held voltage to said electronic tuning converter as said tuning voltage.

2. A CATV tuning system comprising:
   a channel selecting device providing as an output an indication of a desired channel;
   a channel signal separating circuit coupled to receive a tuned TV channel from the output of a tuning circuit and to output tuned channel information derived from and indicative of the tuned TV channel;
   a data comparing circuit coupled to receive as inputs the output of the channel selecting device and the tuned channel information and to generate at an output a voltage holding signal when the desired channel indicated by the output of the channel selecting device is the same as the tuned TV channel indicated by the tuned channel information;
   a sweep signal generating circuit generating a sweep signal;
   a voltage holding circuit coupled to receive the sweep signal and the output of the data comparing circuit, the voltage holding circuit providing as an output to a tuning circuit a tuning voltage which is responsive to the sweep signal and has a voltage range capable of causing a tuning circuit to tune all available CATV channels, the tuning voltage being held constant during receipt of the voltage holding signal from the data comparing circuit; and
   a circuit coupled to receive the tuned TV channel information from the channel signal separating circuit and transmit the tuned TV channel information to a CATV center.

* * * * *